United States Patent

[11] 3,621,069

[72] Inventor James C. Wygant
　　　　　　 Creve Coeur, Mo.
[21] Appl. No. 860,784
[22] Filed Sept. 24, 1969
[45] Patented Nov. 16, 1971
[73] Assignee Monsanto Company
　　　　　　 St. Louis, Mo.

[54] METHOD FOR PREPARING α,α'-DICUMYL
　　 FROM α-CUMENE HYDROPEROXIDE
　　 9 Claims, No Drawings
[52] U.S. Cl. .................................................... 260/668
[51] Int. Cl. .................................................... C07c 15/00,
　　　　　　　　　　　　　　　　　　　　　　　　 C07c 15/02
[50] Field of Search .......................................... 260/668

[56]　　　　　　　 References Cited
　　　　　　　　 OTHER REFERENCES

Von George A. Twigg et al., Erdolund Kohle, Vol. 15, pp 74– 78, 1962.
　The Chemistry of Hydrocarbons, Ed. Brooks et al. Vol. 2, pp. 339– 340, Reinhold Publishing, 1955.
　Kharasch et al. J. Org. Chem., 15, 763, 1950.
　Kharasch et al., J. Org. Chem., 16, 105, 1951.
　K. V. Topchieva et al., Vestn. Mosk. Univ., Ser. II Kh.m. 18 (3) 18– 23, 1963, (Chem. Abs. 59:6166C)

*Primary Examiner*—Delbert E. Gantz
*Assistant Examiner*—Veronica O'Keefe
*Attorneys*—Neal E. Willis, J. E. Maurer and Wayne R. Eberhardt ABSTRACT: Cumene hydroperoxide is decomposed in the presence of cumene at an elevated temperature and superatmospheric pressure to form α,α'-dicumyl, cumyl alcohol, and water.

METHOD FOR PREPARING α,α'-DICUMYL FROM α-CUMENE HYDROPEROXIDE

BACKGROUND OF THE INVENTION

1. Field of the Invention

This invention relates to the preparation of aromatic hydrocarbons, and more specifically, to the preparation of the compound α,α'-dicumyl, also known as α,α,α',α'-tetramethylbibenzyl and 2,3-dimethyl-2,3-diphenyl butane.

2. Description of the Prior Art

Many methods for the preparation of dicumyl are described in the literature. For example, it is known to decompose dicumylperoxide in cumene to form dicumyl, cumyl alcohol, and methane. In another method, cumene is irradiated with ultraviolet light in the presence of a phenyl-radical source to yield mainly benzene, some dicumyl, and a mixture of isomeric isopropylbiphenyls. It is also known to react cumene with carbon tetrachloride in a light-activated reaction to yield HCl, CHCl₃, various chlorination products, and dicumyl. Similarly, photolysis of a solution of cumene and MeHgI yields dicumyl and methane. In yet another method cumene is reacted with tert-butyl peroxide to form dicumyl, tert-butyl alcohol, and acetone.

The above-described methods typically suffer from one or more disadvantages such as low yields, difficult reaction conditions, or expensive raw materials. For example, the reaction of tert-butyl peroxide with cumene to form dicumyl proceeds with good yields, but the process is economically unattractive due to raw material costs.

It is also known in the literature that α-cumene hydroperoxide may be thermally decomposed to α,α'-dicumyl, this reaction being described by Kharasch et al. in the Journal of Organic Chemistry, Vol. 16, page 116 (1951). In this process however, the α,α'-dicumyl is recovered as part of a high-boiling residue at only 5 percent yield. The present invention describes a method whereby α-cumene hydroperoxide may be thermally decomposed to provide α,α'-dicumyl economically and in good yield.

SUMMARY OF THE INVENTION

A process for the production of α,α'-dicumyl wherein cumene hydroperoxide, either alone or in solution with cumene, is added to a reaction zone containing a charge of cumene under superatmospheric pressure and at a temperature in excess of 175° C. The rate of addition of the cumene hydroperoxide is regulated to maintain the concentration of unreacted cumene hydroperoxide in the reaction zone at less than about 1 percent by weight. The reaction is discontinued before the molar ratio of cumene hydroperoxide to total cumene charged to the reactor exceeds about 1 to 3, and the α,α'-dicumyl product is recovered from the reaction mass by distillation and recrystallization.

DESCRIPTION OF PREFERRED EMBODIMENTS

In accordance with this invention, it has now been discovered that high yields of dicumyl can be obtained by reacting cumene hydroperoxide, hereinafter referred to as CHP, with an excess of cumene under conditions such that the concentration of unreacted CHP in the reaction medium does not exceed about 1 percent by weight. Under the conditions of this invention, the CHP is found to react quickly with the cumene to form dicumyl, cumyl alcohol, and water with a minimum amount of side products.

The conditions of reaction are defined by temperature, molar ratio of CHP to cumene, and rate of addition of CHP to the reactor. The reaction is most conveniently conducted in a semicontinuous mode of operation, with the CHP being metered into a reactor precharged with cumene. After a predetermined amount of CHP has been added to the reactor, as determined by the limit of molar ratio of CHP to cumene, the reactor contents are processed for recovery of the α,α'-dicumyl.

The temperature of the reaction is preferably maintained within the range of 175 to 250° C., and more preferably within the range of 200° to 230° C. Since cumene boils at 154° C., pressure is necessary to achieve these higher reaction temperatures. It is convenient to equip the reactor with a pressure relief valve set at about 75 p.s.i.g. As the reaction proceeds, the pressure increases from an initial value of about 50 p.s.i.g. to the relief pressure, at which time a mixture of water and gaseous byproduct (methane) is continuously vented. If desired, the reactor may be pressurized with nitrogen at the start of the reaction to reduce the initial rate of reflux.

The molar ratio of CHP to cumene is preferably limited to not exceed 1 to 3, and a ratio of less than about 1 to 5 is generally preferred. It has been found that large excesses of cumene promote higher yields of dicumyl, and that the maximum excess of cumene commensurate with economic and equipment considerations is therefore desirable.

The molar ratio of CHP to cumene is based upon the total moles of CHP and cumene involved in the reaction. All the cumene may be precharged to the reactor, or a part may be precharged with the remainder being added concurrently with the CHP. Either method is satisfactory, the only requirement being that a sufficient amount of cumene be precharged to the reactor to provide an initial reaction medium.

As previously discussed, the rate of addition of CHP must be controlled to prevent any substantial accumulation of undecomposed peroxide in the reactor. Generally, it is preferable to maintain the peroxide level at less than 1 percent. The maximum rate of addition of CHP to the reactor is largely dependent upon the particular variables of individual systems, such as reactor size, baffle design, agitator design and speed, point of entry of CHP (above or below surface), method of entry of CHP (single pipe, slinger ring or other distribution system,) concentration of CHP feed if diluted with cumene, reaction temperature, etc. These variables all affect the rate of mixing and decomposition of the CHP, and therefore the maximum rate of addition of CHP to the reactor will vary according to the effect of these variables. A well mixed reactor at a temperature of about 220° C., for example, may be operated at a substantially higher CHP addition rate than a poorly mixed reactor at a lower temperature. As a practical consideration, the maximum CHP addition rate must be separately determined for each individual system.

In a preferred embodiment of the present invention, the equilibrium concentration of undecomposed CHP in the reaction zone during the CHP addition period has been found to be less than 0.5 percent. Although the concentration of peroxide in the reactor may exceed 1 percent during the initial period of operation, it is preferred that the equilibrium concentration be maintained at less than about 1 percent during the bulk of the reaction period. After all the CHP has been added to the reaction, the mixture is held at the reaction temperature for 30 minutes or longer until the peroxide content decreases to less than about 0.1 percent. The excess cumene and the cumyl alcohol are removed by distillation leaving a dicumyl residue which may be recovered as a white solid by crystallization from ethyl alcohol.

The concentration of CHP in the reaction zone may be conveniently determined according to the procedure given in "Quantitative Organic Analysis via Functional Groups," by Siggia, pp. 100–101, 1949, entitled "Iodometric Determination of Peroxides."

The method of instant invention is further illustrated by the following examples which are intended to be illustrative only and not limiting of the scope of the invention.

EXAMPLE

A series of runs were made in a 1-liter stainless steel autoclave equipped with propellor-type agitator, dip-tube with valve for sampling, pressure gauge, and reflux condenser. The autoclave was heated with an electric heating mantle. A relief valve set for 75 pounds was mounted atop the reflux condenser.

Cumene was charged to the autoclave through a charging port. The port was closed, and the autoclave was stirred and heated to the desired operating temperature. When the specified temperature was reached, the inlet valve was opened and cumene hydroperoxide was metered into the reactor with a variable flow piston pump equipped with a volumetrically calibrated feed reservoir. As the reaction proceeded the pressured increased, and at 75 pounds a mixture of methane and water vapor vented through the relief valve. Peroxide concentration of the reaction mixture, monitored by periodic sampling through the dip tube, was found to be consistently less than 0.5 percent.

When the desired amount of cumene hydroperoxide had been added, the pump was stopped. After an additional one-half to 1 hour at operating temperature, heating was stopped.

When cool, the autoclave was vented and opened, and the product removed. The reaction mixture was filtered and vacuum-stripped through a short Vigreux column to remove excess cumene and byproducts cumyl alcohol and acetophenone. The residue, a yellow oil, crystallized on cooling. It was recrystallized from about 3 parts of ethyl alcohol to yield the product dicumyl as a white crystalline solid, m.p. 114°–116°. The conditions of reaction and the yield of $\alpha,\alpha'$-dicumyl for each run were as follows:

tion rate. It is also contemplated that, by heating a separate steam of cumene to reaction temperature, then metering a CHP feed into this stream with provision for required mixing and reaction time, the semicontinuous process described could easily be converted to a fully continuous process.

The use of peroxide decomposition catalysts is also considered to be within the scope of the present invention. These catalysts are well known for their function, and include such mildly basic materials as the alkali earth oxides and acetates, and the alkali metal carbonates, bicarbonates, and acetates.

The decomposition of CHP to $\alpha,\alpha'$-dicumyl should be conducted in the absence of any mineral acids. The addition of small amounts of mildly basic materials therefore, in addition to their catalytic effect, also serve to neutralize any trace amounts of mineral acids which might be present. The mineral acids, if not inhibited, promote the formation of phenol and acetone by decomposition of CHP, and thereby drastically reduce the yield of dicumyl.

The dicumyl produced by the method of this invention has many uses, and may for example be hydrogenated to form an oxidatively stable base stock for functional fluids.

Having thus described and defined my invention, what I claim is:

1. A process for the preparation of dicumyl which com-

| Run | | Reactor Precharge moles of cumene | Reactor feed, moles | | Total moles cumene | Molar ratio CHP: cumene | Reaction temperature, °C. | Feed addition time, hours | Dicumyl yield, percent |
|---|---|---|---|---|---|---|---|---|---|
| | | | CHP | Cumene | | | | | |
| Series A | a | 2.0 | 0.2 | 0.4 | 2.4 | 1:12 | 180 | 5.8 | 27.9 |
| | b | 2.0 | 0.2 | 0.4 | 2.4 | 1:12 | 200 | 4.1 | 33.9 |
| | c | 2.0 | 0.2 | 0.4 | 2.4 | 1:12 | 215 | 3.8 | 44.8 |
| Series B | d | 2.0 | 0.4 | 0.4 | 2.4 | 1:6 | 210 | 2.0 | 27.7 |
| | e | 2.0 | 0.4 | 0.4 | 2.4 | 1:6 | 220 | 2.0 | 31.8 |
| | f | 2.0 | 0.4 | 0.4 | 2.4 | 1:6 | 230 | 2.0 | 30.1 |
| Series C | g | 2.0 | 0.4 | 0.4 | 2.4 | 1:6 | 215 | 6.0 | 33.8 |
| | h | 1.2 | 0.4 | 1.2 | 2.4 | 1:6 | 215 | 4.0 | 32.7 |
| | i | 2.0 | 0.4 | 0.4 | 2.4 | 1:6 | 215 | 2.5 | 35.7 |
| | j | 2.0 | 0.4 | 0.4 | 2.4 | 1:6 | 220 | 2.0 | 31.8 |
| | k | 2.0 | 0.4 | 0.4 | 2.4 | 1:6 | 220 | 4.0 | 33.5 |
| Series D | l | 4.2 | 0.7 | 0 | 4.2 | 1:6 | 220 | 5.2 | 33.5 |
| | m | 3.6 | 1.2 | 0 | 3.6 | 1:3 | 220 | 5.2 | 27.3 |
| Series E | n | 1.0 | 0.1 | 0.2 | 1.2 | 1:12 | 150 | 7.0 | 11.5 |
| | o | 2.0 | 0.1 | 0.2 | 2.2 | 1:22 | 155 | 6.2 | 16.3 |

The data in Series A above show the effect of reaction temperature on dicumyl yield. Specifically, the data show that, at a 1:12 molar ratio of CHP: cumene, the dicumyl yield is increased from about 28 percent to about 45 percent by increasing the reaction temperature from 180° C. to 215° C. Similar data for a 1:6 molar ratio of CHP: cumene presented in Series B also show that good yields are obtained at 220° and 230° C.

The CHP addition rate was not critical at the levels employed in this Example, as evidenced by comparison of runs (g), (h) and (i) of series C, wherein the CHP addition time was decreased from 6 hours to 2.5 hours with no significant change in dicumyl yield. Runs (j) and (k) of this Series produced results essentially equivalent to those of runs (g), (h) and (i) at the slightly higher temperature of 220° C. vs. 215° C. Run (1) in Series D shows that operation with a feed stream consisting solely of CHP and with a total molar ratio of CHP: cumene of 1:6 provides a good yield of dicumyl. Run (m) shows a slight decrease in yield when the CHP: cumene ratio was decreased to 1:3.

Series E data are presented for comparison to show the effect of operating at a reaction temperature below the minimum limit defined by the invention. At a temperature of 155° C., the yield of $\alpha,\alpha'$-dicumyl was only about 16 percent, whereas when operating within the temperature limits of this invention, yields in excess of 30 percent are generally obtained.

The preceding examples serve to illustrate the practice of the present invention, but the invention is not intended to be limited thereto. For example, given the knowledge of this invention, it is within the ability of one skilled in the art to modify the described procedure by employing a variable CHP addiprises heating cumene hydroperoxide with cumene at a temperature above about 175° C. and at superatmospheric pressure the ratio of cumyl hydroperoxide to cumyl being less than 1 to 3.

2. A process of claim H wherein the cumene reactant is precharged to a reaction zone and heated to reaction temperature, and the cumene hydroperoxide is added thereto at a rate determined to maintain the concentration of cumene hydroperoxide in the reaction zone at less than about 1 percent by weight.

3. A process of claim 2 wherein the reaction temperature is between 200° C. and 230° C.

4. A process of claim 2 wherein the molar ratio of cumyl hydroperoxide to cumene is between about 1 to 6 and 1 to 12.

5. A process of claim 2 wherein the concentration of cumene hydroperoxide in the reaction zone is maintained at less than about 0.5 percent by weight.

6. A process of claim 2 wherein a part of the cumene reactant is charged to the reaction zone and the remainder is added thereto concurrently with the cumene hydroperoxide.

7. A process for the preparation of $\alpha,\alpha'$-dicumyl which comprises a. charging a reaction zone with a first reactant comprising $\alpha$-cumene, b. heating said first reactant under pressure to a temperature above about 175° C., c. adding to said heated first reactant a second reactant comprising $\alpha$-cumene hydroperoxide, and d. discontinuing the addition of the second reactant before the molar ratio of cumene hydroperoxide to cumene added to the reactor exceeds 1 to 3, 8. A process of claim 7 wherein the reaction temperature is maintained between 200° C. and 230° C.

9. A process of claim 7 wherein the second reactant comprises a mixture of α-cumene hydroperoxide and α-cumene.